A. SCHERBIUS.
MEANS FOR IMPROVING THE POWER FACTOR OF INDUCTION MACHINES.
APPLICATION FILED DEC. 12, 1911.
1,187,180.
Patented June 13, 1916.
4 SHEETS—SHEET 1.
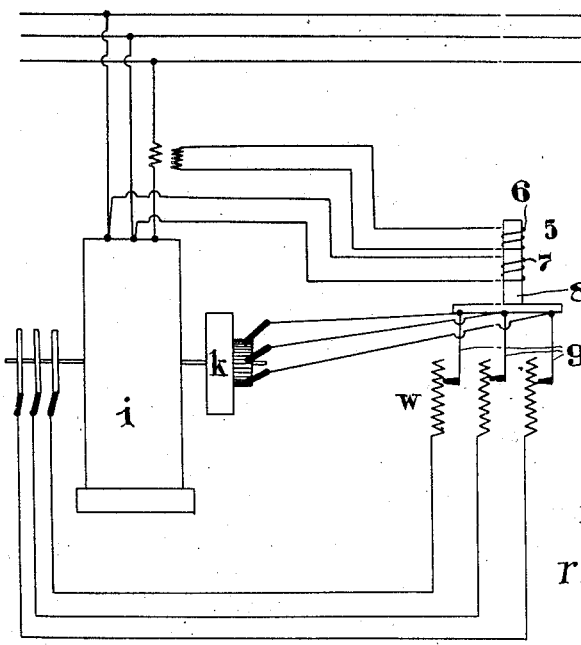
Fig. 14.
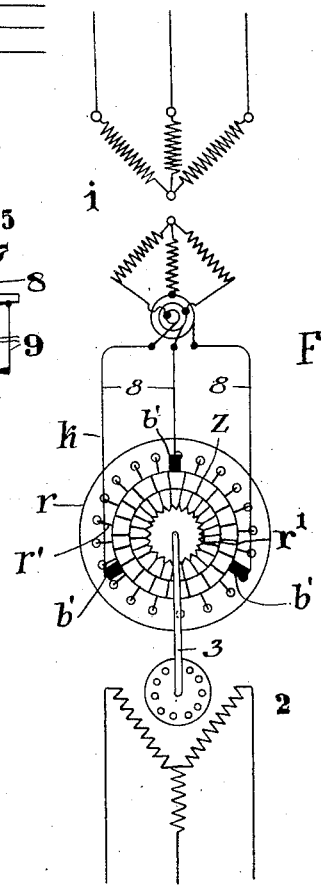
Fig. 1.
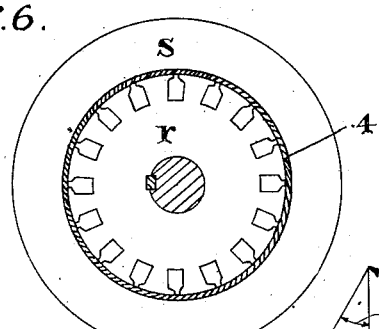
Fig. 6.
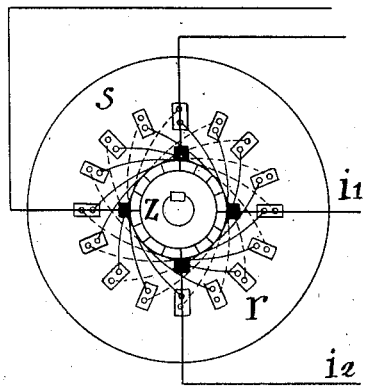
Fig. 2.
Fig. 3.
Witnesses:
Ewd L Tolson
Chas F Calhoun, Jr
Inventor:
Arthur Scherbius,
by [signature]
Attorney A. SCHERBIUS.
MEANS FOR IMPROVING THE POWER FACTOR OF INDUCTION MACHINES.
APPLICATION FILED DEC. 12, 1911.
1,187,180.
Patented June 13, 1916.
4 SHEETS—SHEET 2.
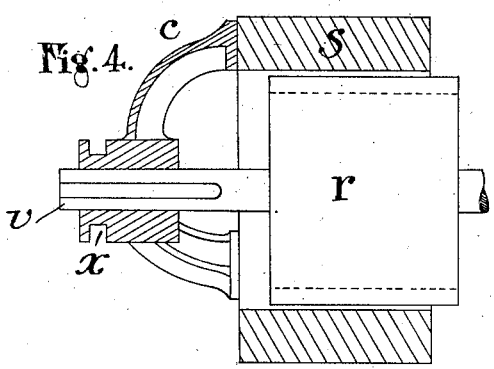
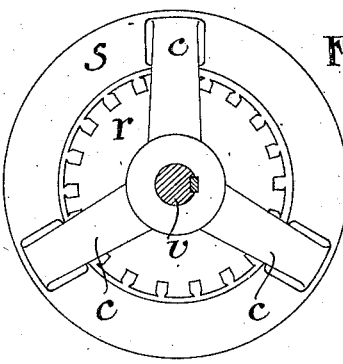
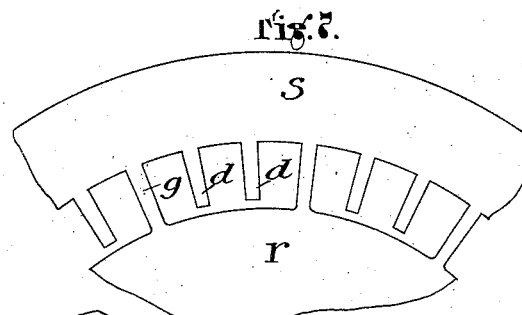
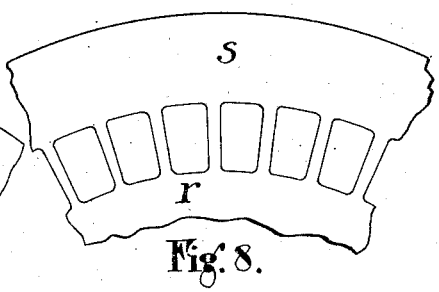
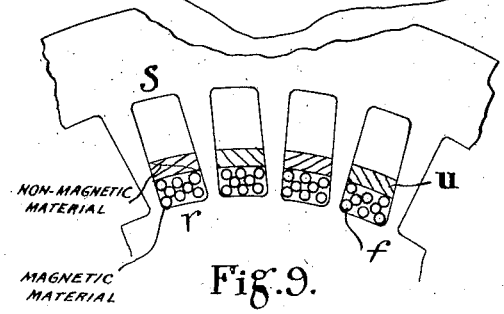
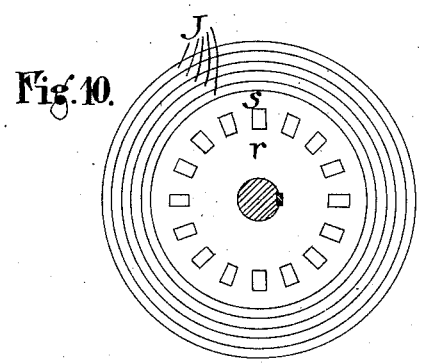
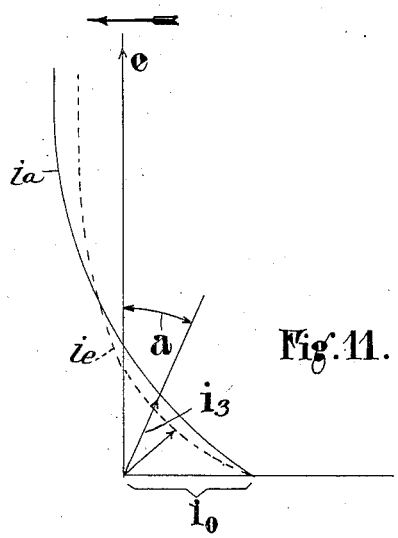
Witnesses.
N. M. Barrett
C E Parsons
Inventor.
Arthur Scherbius
By Spear, Middleton, Donaldson & Spear
Attorney.

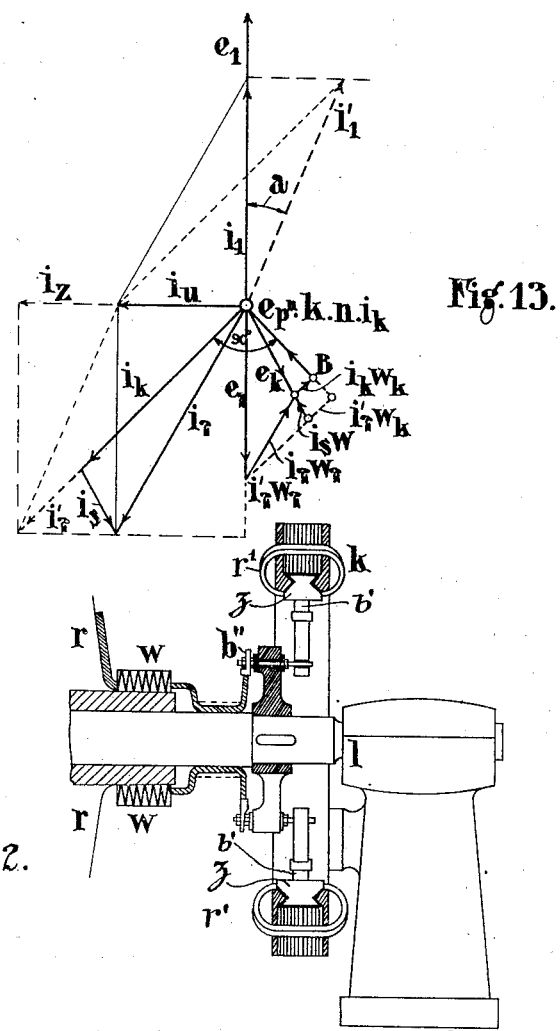

A. SCHERBIUS.
MEANS FOR IMPROVING THE POWER FACTOR OF INDUCTION MACHINES.
APPLICATION FILED DEC. 12, 1911.
1,187,180.  Patented June 13, 1916.
4 SHEETS—SHEET 4.
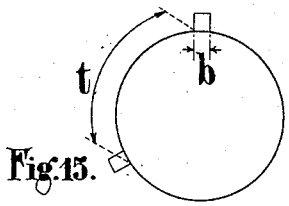
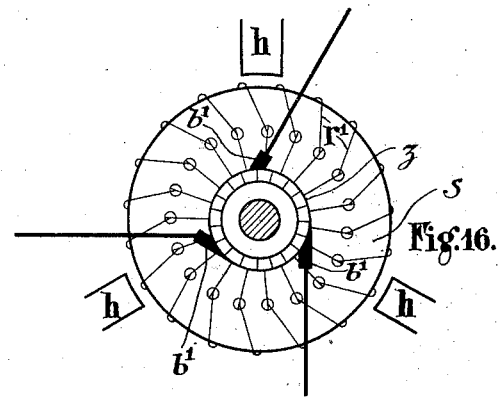
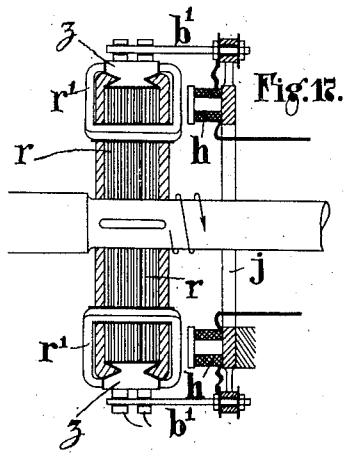
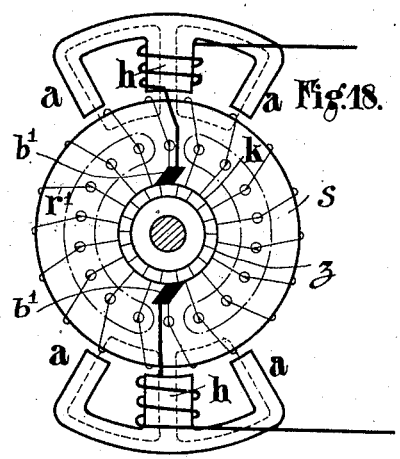
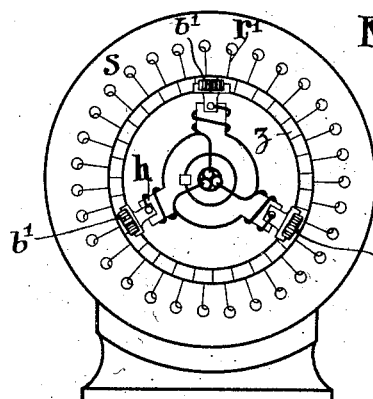
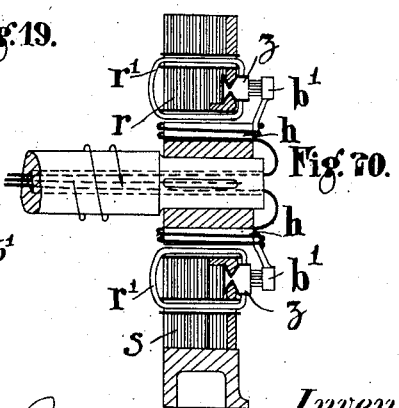

UNITED STATES PATENT OFFICE.

ARTHUR SCHERBIUS, OF BADEN, SWITZERLAND, ASSIGNOR TO AKTIENGESELLSCHAFT BROWN BOVERI & CIE., OF BADEN, SWITZERLAND.

MEANS FOR IMPROVING THE POWER FACTOR OF INDUCTION-MACHINES.

1,187,180.             Specification of Letters Patent.      Patented June 13, 1916.

Application filed December 12, 1911. Serial No. 665,207.

*To all whom it may concern:*

Be it known that I, ARTHUR SCHERBIUS, a subject of the German Emperor, of Baden, Switzerland, have invented certain new and useful Means for Improving the Power Factor of Induction-Machines, of which the following is a specification.

This invention relates to dynamo electric induction and like machinery with especial reference to the phase compensation of induction motors.

It has already been proposed to compensate the phase displacement of an induction motor by connecting up a correspondingly excited commutator dynamo to its slip-rings. Now with very large motors it is frequently of importance automatically to obtain a good compensation under any load. However, with smaller units it will often suffice completely to suppress the phase displacement only at the particular load most generally present, for example at full load, and to permit a certain phase displacement for the other working conditions. This will then permit the use of a machine of known arrangement without stator winding.

The main object of the present invention is to provide improved or simplified means for phase compensation in induction motors.

The invention in brief consists in a construction and arrangement of commutator machine connected to an induction motor whereby both internal and external yoke of the commutator machine rotate together.

The invention also consists in modifications in which the commutator machine is provided with an air gap with means for rendering it suitable to the present invention.

The invention also consists in an arrangement for the purpose indicated having resistance provided to effect final phase compensation.

The invention also consists in a modified arrangement of commutator machine as referred to above in which auxiliary poles are provided.

Referring to the accompanying diagrammatic drawings which are given by way of example only:—Figure 1 shows the diagram of connections of an arrangement according to one form of the present invention in which an induction machine whose phase displacement is to be compensated is connected to a compensator machine without air gap between internal and external yokes. Fig. 2 shows diagrammatically a form of construction of compensator machine for compensating the phase displacement in a two-phase machine. Fig. 3 is a vector diagram explaining the action of the compensator machine. Figs. 4 and 5 show in section and end elevation one construction of displaceable external iron system. Fig. 6 represents a modification in which the air gap between the external and internal yokes of the compensator machine is filled by a solid non-magnetic material. Figs. 7 and 8 show modifications of the means for obtaining the desired saturation effect by suitable construction of external yoke or teeth. Fig. 9 shows another modification in which large grooves are provided partly filled if desired with iron or non-magnetic material. Fig. 10 shows a further modification in which are provided removable iron rings for the purpose of adjusting the saturation effect. Fig. 11 is an explanatory diagram. Fig. 12 illustrates part of a modified arrangement in which resistances are added for effecting final phase compensation. Fig. 13 is a vector diagram explaining the effect of the addition of resistance. Fig. 14 shows an arrangement for effecting phase compensation automatically by the automatic insertion of resistances. Fig. 15 is an explanatory diagram. Fig. 16 illustrates diagrammatically a general arrangement of three-phase compensator machine with ring winding, stationary brushes and auxiliary poles. Fig. 17 shows a modified construction and arrangement in which auxiliary poles are provided to act on the side of the internal yoke of the compensator machine and the commutator thereof is formed on the periphery of the moving member. Fig. 18 shows a similar construction of compensator to Fig. 17 but the compensator is arranged for use with single phase machines, the auxiliary poles having lateral projections for providing a return circuit for the auxiliary pole flux. Figs. 19 and 20 illustrate a further modified construction in which the brushes and auxiliary poles are adapted to rotate whereas the iron system with commutator remains stationary.

In Fig. 1 $i$ is the induction motor whose phase displacement is to be compensated.

The slip rings of this induction motor are connected by leads 8 to brushes $b_1$ of the compensator machine $k$. In the form illustrated in Fig. 1 the compensator $k$ comprises an iron body $r$ with windings $r'$ arranged in grooves therein connected to the commutator $z$ and mounted on a shaft 3 which may be rotated by any suitable means such as an electric motor 2. The action of the compensator machine may best be understood by reference to Fig. 2 in which is diagrammatically represented the compensator with iron system $s$ having windings thereon and a commutator $z$ to which currents $i_1$ and $i_2$ are supplied from the machine to be compensated by means of brushes.

The following considerations apply in general for polyphase arrangements, but in the present case for the purpose of explanation the action of a two-phase arrangement will be considered. The current $i_1$ is always vectorially speaking displaced by 90 degrees in relation to the current $i_2$. The currents $i_1$ and $i_2$ produce in the ring a field rotating at a speed $c_n - c_2$, $c_2$ being the slip periodicity of the two currents $i_1$, $i_2$ and $c_n$ the periodicity resulting from the speed and number of poles in the ring. This rotating field produces in the windings coaxial to the axis of the brushes through which the current $i_2$ is passing a rotation voltage in phase with the current $i_1$ and this rotation voltage is consequently displaced by 90° with respect to time in relation to the current $i_2$. If the direction of rotation of the ring be assumed to be the same as the direction of phase-succession of the currents $i_1$ and $i_2$ then with respect to the rotating field the ring rotates at a rate in excess of the synchronous speed and acts as a capacity that is to say it produces currents leading the voltages. At first glance it would appear remarkable that a voltage can be produced in a machine without a fixed external yoke or what practically signifies the same thing, without a stationary wound external system. It should be remembered, however, that the current is absolutely wattless and consequently with such an arrangement no electrical energy can be given out and a reception of energy can take place only in so far as this is possible in choking coils.

In the diagram Fig. 3, $e$ is the slip-ring voltage of the machine whose phase displacement is to be compensated, $i$ the slip-ring or brush current is caused to lead $e$ by the angle $a$ and forms the magnetizing current for the other phases of the commutator machine. The ohmic drop $iw$ is displaced by 180 degrees in relation to the current $i$ and the rotation voltage $e_r$ leads the current by 90 degrees. As the magnitudes of all these qualities vary approximately proportionally with the slip, the angles of the triangle in the diagram remain constant under variations of load and consequently also the phase displacement between $c$ and $i$ remains constant. The primary phase displacement of the machine to be compensated, however, varies with the load and consequently the phase compensation attained with the commutator machine connected up in cascade, will be incomplete at other than normal load.

As may be seen from the diagram, Fig. 3, the whole of the current $i$ supplied to the compensator machine serves for magnetizing and for covering the ohmic loss in the compensator machine and consequently the mechanical consumption of energy by the latter is very insignificant. This fact renders the commutator machine which is an exceptionally cheap and simple construction, also cheap and economical when working. The adjustment of the commutator machine to the desired phase compensation can, for example, be effected by axial displacement of the external yoke with respect to the internal yoke or if an air gap be present by varying the air gap or furthermore by speed adjustment of the compensator machine. Preferably some or all of the above means may be employed during the working for entirely compensating phase displacement at various loads the corresponding manipulation being effected by hand or automatically.

In the form of construction shown by way of example in Figs. 4 and 5 the commutator machine is constructed with an air gap between the internal yoke $r$ and external yoke $s$ by fastening the latter to the main shaft $v$ by means of arms $c$ and if necessary may be rendered adjustable by providing a displaceable boss $x$ as shown.

The air gap between external and internal yokes may be filled as in the modification shown in Fig. 6 with a solid non-magnetic body 4 such as wood, both yokes being of course rotated together.

In Fig. 7 an air gap is arranged beneath a number of the teeth $d$, whereas the remaining teeth $g$ occasion the mechanical iron connection between external yoke $s$ and internal yoke $r$. A similar action to that of an air gap can, as is well-known, also be attained by high iron saturation one arrangement for effecting this being shown in Fig. 8 in which the teeth are made wholly or partly very narrow. An adjustability of the saturation of the machine can be attained by providing according to Fig. 9 large grooves and filling them according to the desired effect partly with iron $f$ or with non-magnetic material $u$.

If the region of high saturation be situate in the outer yoke then for the purpose of adjusting the saturation effect of the machine iron rings $j$ may be provided as shown in Fig. 10, which may be detached axially from the exterior of the yoke $s$, varying thereby the area of section of the magnetic paths in the said yoke and consequently also the saturation effect.

Besides the advantages of constructive simplicity, economy of material and cheapness, the employment of high iron saturation in the compensator machine has the further advantage that the compensation of the main motor can be extended to a much greater range of load than is possible when unsaturated machines provided with an air gap are employed as is clear from Fig. 11 in which $e$ shows the direction of the terminal voltage of the compensated induction motor, $i_3$ the stator current. The end point of the current vector $i_3$ describes with varying load the curve $i_a$ shown in full lines in the case of unsaturated commutator machines with air gap, whereas it describes the dotted curve $i_c$ in the case of highly saturated machines.

The phase displacement angle is shown by $a$ and the magnetizing current of the induction motor by $i_o$. It is evident from this figure that by producing the effect represented by the dotted line the range of approximate phase compensation is extended since as the load rises the phase of $i_3$ remains substantially constant according to the dotted curve, but continues to lag more and more according to the full line curve.

In certain circumstances it may be of advantage for the purpose of fine adjustment of phase to arrange resistances to reduce the current through the brushes. For example if the group be constructed with rotary brushes and fixed compensator as in the modification shown in Fig. 12, the resistance $w$ may be electrically connected to the brush $b'$ and rotated with the brush spider $b''$ which in turn may be mechanically coupled to the rotor R of the induction motor, the latter being mounted in a bearing $l$ on the standard $p$ of which the fixed compensator is mounted. The compensator is wound for example with a ring winding and is provided with an internal commutator $z$ with which the rotary brushes $b'$ contact.

The effect of the resistance may be easily appreciated on consideration of Fig. 13. If it be supposed that the compensator occasions a supercompensation correspondingly to the dotted lines of the diagram so that the main current $i_3$ in the stator of the induction rotor leads the line E. M. F. $e_1$ by the angle $a$, the phase leading of the stator current of the induction motor may be expressed in the diagram by an additional wattless current $i_z$. Now the problem consists in so reducing the rotation voltage $e_r$ of the compensator that the wattless component of the current will be just equal to $i_u$ the diagram then including only the full lines. This is effected by the added resistance component $i_s$, $w$, which reduces the slipring voltage of the compensator machine to the value $e_k$ as indicated in Fig. 13. Without the parallel resistance $w$ indicated in Figs. 12 and 14 the current in the compensator would be equal to the rotor current $i_4'$, but with this resistance the rotor current $i_4'$ is split up into the compensator-current $i_k$ and the shunt current $i_s$ possessing the same phase as $e_k$. The remaining quantities in the diagram are self explanatory, $w_2$ being the rotor resistance of the induction motor and $w_k$ the resistance of the compensator.

If it be desired to obtain various phase compensations automatically during working, as may be the case for example with buffer plants, then resistances are arranged external to the machine and are arranged to be displaced by a relay, which is actuated by changes of the power factor of the main machine. One form of apparatus suitable for this purpose is indicated in Fig. 14 in which the main machine $i$ and the compensating machine $k$ are mounted on one shaft. The effect of the resistances $w$ is varied by means of the relay 5 comprising a core 8 with a crosspiece carrying contact arms 9, which is operated according to the power factor existing in the main machine by means of the coils 6 and 7 energized respectively in proportion to the current and voltage of the main machine.

Considerations of sparkless commutation enforce a restriction on the allowable output from compensators constructed according to the above examples of carrying the present invention into effect as is evident from the following remarks with reference to Fig. 15. Assuming that the voltage between adjacent brushes separated by $t$ commutator bars or segments amount to $p$ volts, the width of the brushes covering $b$ segments, then the voltage between the segments bridged by the brushes will be $$e = \frac{b}{t} p \text{ volts.}$$

Hence with given commutator segment and brush dimensions the allowable capacity of the machine is limited.

By the provision of auxiliary poles however, to compensate the injurious voltages between the brushes compensator machines may be constructed for any desired output. In order that auxiliary poles can really act on the armature coils short circuited by the brushes, the armature coils must cut the flux of the auxiliary poles at the current place. Now, however, normally the winding is surrounded on all sides by iron and is removed from the flux of external auxiliary poles and only when it is made as a ring-winding are any portions of the winding situate on the outer surface of the machine. Consequently in applying the present invention a ring-winding is provided in Fig. 16 in which is indicated a general arrangement, $h$ representing the auxiliary poles, $r'$ the ring-winding and $z$ the commutator. The auxiliary poles are excited by the brush current of one phase or of a combination of several phases.

In the arrangement shown in Fig. 17, the outwardly situated portion of the ring-winding $r'$ is formed as a commutator $z$, whereas the auxiliary poles $h$ connected in series with the brushes are arranged at the side, their fixed connecting yoke $j$ carrying the brushes $b'$. The auxiliary poles might also be arranged on both sides of the rotor.

In Fig. 18 is indicated a modified single-phase arrangement in which the auxiliary poles $h$, $a$ are arranged exterior to the rotor as in Fig. 16 and are excited by brush current. Owing to this construction of the auxiliary poles a connecting yoke for the same joining the auxiliary poles together is unnecessary, each of the auxiliary poles $h$ being provided with one or two additional branches $a$ by means of which the iron circuit of each auxiliary pole is closed. The course of the magnetic flux of the auxiliary pole is indicated by dashes and that of the main field by chain lines. This arrangement has the advantage of considerable economy of copper on the main coils as the magnetic circuit, by which the flux of the auxiliary poles is closed, in this case only passes through the armature ampere windings at the region of commutation, whereas the other armature windings are situate outside the path of the auxiliary pole flux.

It is evident that the invention can also be applied to dynamos with fixed winding and rotary brushes in which case the auxiliary poles and if necessary their yoke may rotate together with the brushes as shown for example in Figs. 19 and 20 in which similar reference letters correspond to like parts in the preceding figures.

Having now described my invention, what I claim as new and desire to secure by Letters Patent is:—

1. In dynamo electric machinery in combination, an induction motor with wound rotor, slip rings and brushes coöperating therewith, a dynamo electric phase compensating machine comprising an internal magnetic yoke, an external magnetic yoke, exciting windings on one of said yokes, a commutator and brushes coöperating therewith, a mechanical and magnetic connection between said yokes, the dimensions of the magnetic connection being such that saturation is effected when the machine is in action; means capable of rotating the aforesaid magnetic yokes and a driving connection between said means and said yokes, together with electrical connections from the brushes of the phase compensating machine to the brushes of the induction motor.

2. A dynamo electric phase compensating machine comprising means providing a magnetic circuit, including an internal magnetic yoke, an external magnetic yoke, a mechanical connection between said yokes; winding disposed on one of said yokes adapted to saturate a portion of the magnetic circuit when the machine is in operation, a commutator and brushes connected therewith, means for rotating said yokes and a mechanical connection between said means and said yokes.

3. In dynamo electric machinery, in combination, an induction motor with wound rotor, slip rings and brushes coöperating therewith, a phase compensating machine including a magnetic yoke, a further magnetic yoke external to the first yoke, teeth on one of the yokes, said teeth forming both a mechanical and a magnetic connection between said yokes, windings disposed on one of said yokes, a commutator and brushes coöperating therewith, said windings being adapted to saturate the aforesaid teeth when the machine is in operation, means for rotating said yokes and a mechanical connection between said means and one of said yokes, together with electrical connections between the brushes of the compensating machine and the brushes of the induction motor.

4. A dynamo electric phase compensating machine comprising means providing a magnetic circuit, including a rotary magnetic yoke, an external magnetic yoke, a rigid mechanical connection between said yokes, windings disposed on one of said yokes adapted to saturate a portion of the magnetic circuit when the machine is in operation, a commutator and brushes operating therewith, electrical connections from the windings to the commutator and electrical connections from the brushes for the conveyance of a substantially wattless current to the machine to be compensated.

In testimony whereof I have signed my name to this specification in the presence of two subscribing witnesses.

ARTHUR SCHERBIUS.

Witnesses:
 HARRY A. McBRIDE,
 AUGUST RÜEGG.